UNITED STATES PATENT OFFICE.

GEORGE T. LEWIS, OF PHILADELPHIA, PENNSYLVANIA.

MANUFACTURE OF OXIDES OF LEAD.

SPECIFICATION forming part of Letters Patent No. 259,026, dated June 6, 1882.

Application filed April 6, 1882. (No specimens.)

*To all whom it may concern:*

Be it known that I, GEORGE T. LEWIS, of the city and county of Philadelphia, in the State of Pennsylvania, have invented new and useful Improvements in the Manufacture of Commercial Oxides of Lead, Litharge or Massicot, Red Lead, and Orange Mineral, of which the following is the description.

Heretofore commercial oxides of lead have been manufactured by heating metallic lead in an oxidizing reverberatory or revolving furnace or by heating white lead in such furnaces to drive out carbonic acid and combined water. I have, however, discovered that the same oxides of lead may be manufactured more economically from the waste-lead fumes of lead-smelting furnaces. The composition of waste-lead fumes depends much upon the character of the lead ore smelted down in the furnaces, and also upon the kind of furnace used.

In the various samples of waste-lead fumes I have had analyzed, and in descriptions of analyses which I have read in books, I have found waste-lead fumes to contain more or less carbon and sulphurets of lead, while much the greater portion of lead present was in the form of sulphate, sulphite, and oxide of lead. There is also generally present more or less arsenic, of which I have found from seven to twenty per cent. In a sample of waste fumes from the smelting of argentiferous lead ore was found:

| | |
|---|---|
| 0.50 | moisture. |
| 1.50 | carbon. |
| 53.79 | sulphate of lead. |
| 29.34 | oxide of lead. |
| 2.67 | sulphurets of lead. |
| 8.09 | arsenious acid. |
| 0.005 | silver. |
| 2.28 | oxide of zinc. |
| 1.825 | antimonious oxide, oxide of iron, alumina and lime. |
| 100 | |

I have discovered that by subjecting waste-lead fumes to the action of carbonate of soda or caustic soda the arsenious acid is made soluble and the sulphate and sulphite of lead are converted into compounds, from which by roasting may be produced commercial oxides of lead. By the roasting process the carbon is oxidized and burned out, while the sulphurets of lead are converted into sulphurous acid and oxide of lead. This can be done by mixing the waste-lead fumes with soda-ash and burning this mixture in an ordinary litharge-furnace till the proper color is obtained. Then the mass is taken out and washed to separate the soluble part from the insoluble part, and the oxide of lead is finely ground for the market. I prefer the following *modus operandi:* The waste-lead fumes are made into a pulp by water, and then boiled with a solution of caustic soda, or, for economical reasons, better, with a solution of carbonate of soda, from one-half to one hour, and longer if very much arsenic is present. The amount of carbonate of soda varies with the composition of the waste fumes. Each equivalent (151.5 parts) of sulphate of lead and (143.5 parts) of sulphite of lead requires one equivalent (53 parts) of carbonate of soda, and to each equivalent (99 parts) of arsenious acid I prefer to use one equivalent (53 parts) of carbonate of soda, though less might be used, while more is unnecessary. For one thousand pounds waste fumes of the above composition should thus be used about two hundred and thirty-two pounds carbonate of soda or its equivalent of commercial soda-ash. After boiling, the insoluble part is allowed to settle and the mother-liquor is run off, and the arsenic may be eliminated from this and the sulphate of soda gained by evaporation and crystallization. The insoluble part is washed well, and is then ready for the furnace. I prefer to press it first in a filter-press, and then place the pressed cakes in the furnace, where it is changed into litharge or red lead, according to the temperature and time employed. After burning, the oxide of lead is ground, and is then ready for the market.

Having thus described my invention, I claim—

The process of manufacturing commercial oxides of lead by subjecting waste lead fumes to the action of carbonate of soda or caustic soda and heat by roasting in a furnace, substantially as set forth.

In testimony whereof I have hereunto signed my name this the 3d day of April, A. D. 1882.

GEORGE T. LEWIS.

In presence of—
S. G. SIMPSON,
H. R. SHULTZ.